United States Patent Office 3,480,937
Patented Nov. 25, 1969

3,480,937
ELECTRICAL POSITION INDICATORS
Anthony George Robinson, East Cowes, Isle of Wight, England, assignor to Westland Aircraft Limited, Somerset, England
Filed Sept. 24, 1965, Ser. No. 489,809
Claims priority, application Great Britain, Sept. 27, 1964, 39,911/64
Int. Cl. G08c 19/06; H01f 21/06
U.S. Cl. 340—196                     6 Claims

ABSTRACT OF THE DISCLOSURE

An electric indicator for controlling the positions of two relatively moveable parts consisting of a detector attached to one part and a coil attached to the other part. The relative movement of the two parts is pivotal and the coil is wound on a curved core the radius of the curve being equal to the distance between the detector and the pivotal point. The coil is in two portions wound in phase opposition and the windings of the two positions are arranged so that the density of turns is highest at the ends of the core and lowest at the adjacent ends of the two portions. This arrangement of turns provides a magnetic field in which the flux density is highest at the ends and decreases to a null point at the center. The detector moves in close proximity to the coil and generates a signal the strength and phase of which depends upon the flux density of the part of the magnetic field in which it is positioned.

---

This invention relates to means for sensing and indicating the position between two relatively movable parts.

Previously, in order to sense and indicate the position of two parts which move in relation to each other, for example the rotary propeller pylon of an air cushion vehicle, a standard rotary A.C. pick-off has been used to feed back pylon positional information to cancel the demand signal when a moving part has attained the demanded position. The operation of the rotary pick-off is by a linkage held against a cam by a spring. The mechanical linkages of such a system are susceptible to wear and lack of environmental protection against dirt, spray and similar hazards resulting in low reliability.

It is an object of the invention to provide means for sensing and indicating the position between two relatively movable parts which has no mechanical moving parts and no moving electrical contacts. It is a further object of the invention to provide electrical components for attachment to each of the relatively moving parts which can be completely encapsulated and thus completely protected against bad environmental conditions.

According to the present invention there is provided means for sensing and indicating the position between two relatively movable parts, one part being movable about an axis of the other part, comprising a coil attached to one of the parts and so arranged with respect thereto that a variation of flux density is obtained about the axis of the one part, and an electromagnetic transducer device attached to the other part and arranged to sense the field strength of the coil to generate a signal dependent upon its position in relation to the coil.

Said other part may be arranged to rotate about said one part which may be stationary.

The coil may be arranged to extend around the periphery of said one part, and the transducer device may be attached to said other part so as to rotate in the same plane as the coil.

According to another aspect, the present invention provides means for sensing and indicating the position between two parts, one movable relatively to the other, comprising a tapered winding so arranged that a variation in flux density is obtained along its length, attached to a first part, and a sensing medium attached to a second part arranged to move in close proximity to the winding and, dependent upon its position in relation to the winding, to sense the field strength of the winding, the combination of the winding and the sensing medium producing a measurable signal.

The coil preferably consists of two similar, step wound field coils in strip form placed end to end, the flux density increasing exponentially from the junction of the two field coils.

The signal may have a phase angle dependent on which of the two coils the transducer device or sensing medium is opposite.

The flux strengths and the output characteristics of the two field coils may be made variable by the addition to the coils of high permeability core sections. These sections may be provided with screw adjustments so as to trim the outputs of the field coils.

Figure 1:
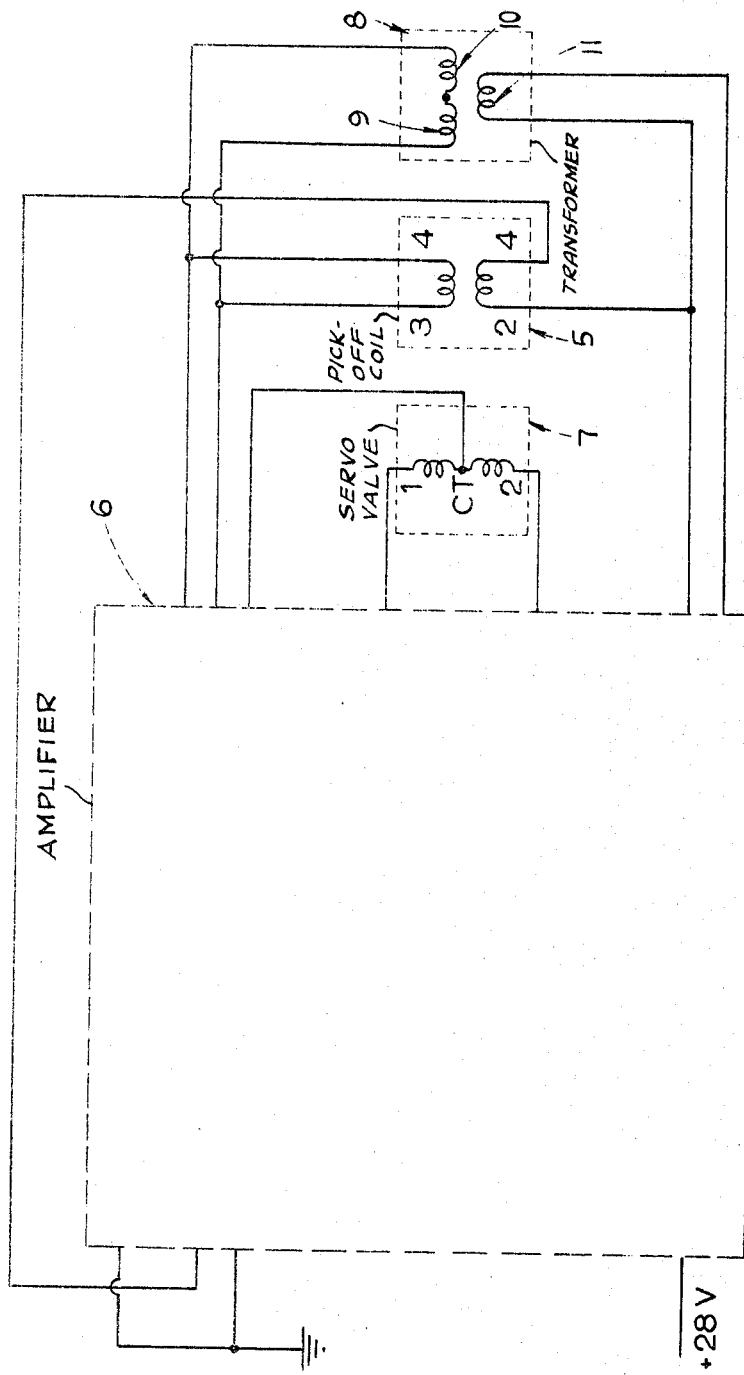
FIGURE 1 illustrates, schematically, an embodiment of an electrical control system for use with the steering control system of an air cushion vehicle for pylon positional information and control.

The electrical control system schematically illustrated in the drawing includes four units grouped in dotted outlines. These units are a steering control wheel demand pick-off 5, an amplifier 6, an electro hydraulic servo valve 7 and a variable ratio transformer 8. The variable ratio transformer 8 consists of two similar step wound field coils 9 and 10 in strip form which are arranged so that they are of opposite phase relationship and which are placed end to end and fixed, after bending to a suitable radius, to the movable pylon (not shown) of the air cushion vehicle.

The two field coils are energized from a 400 c.p.s. A.C. supply and the flux density increases from the junction of the two coils, and in opposite phase respectively.

A detector coil 11 is fixed to the body (not shown) of the air cushion vehicle in the same plane as the two field coils, so that as the pylon rotates relatively to the body, the field coils 9 and 10 move in close proximity over the detector coil 11.

In operation, the control wheel demand pick-off 5 and the variable ratio transformer 8 are energised by A.C. pick-off derived from an oscillator circuit (not shown) within the amplifier.

Movement of the steering control wheel of the air cushion vehicle causes a movement of the wheel demand pick-off 5 which produces an input signal to the amplifier 6. This signal is amplified and fed to the electro hydraulic servo valve 7 and the electro hydraulic servo valve initiates movement in hydraulic rams which actuate the pylon.

As the pylon moves it carries the field coils 9 and 10 with it so that they move across the detector coil 11. The detector coil 11 senses the field strength and produces a signal which is proportional to the distance of the coil 11 from the junction of the coils 9 and 10 and which has a phase angle dependent on which of the two coils it is opposite. This signal, from the detector coil 11 is fed into the amplifier 6 in such a sense as to cancel the rotational demand signal from the steering wheel when the pylon has reached a position proportional to the movement of the wheel.

The elements 9, 10 and 11 are shown, schematically, in

Figure 2:
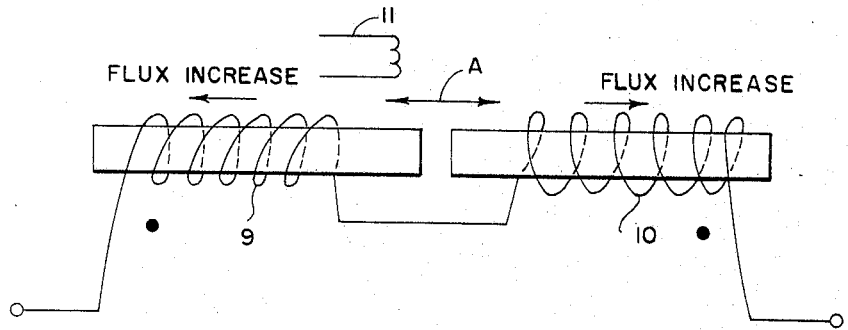
FIGURE 2 is a schematic elevational view of elements forming a part of the system of FIGURE 1.
Figure 3:
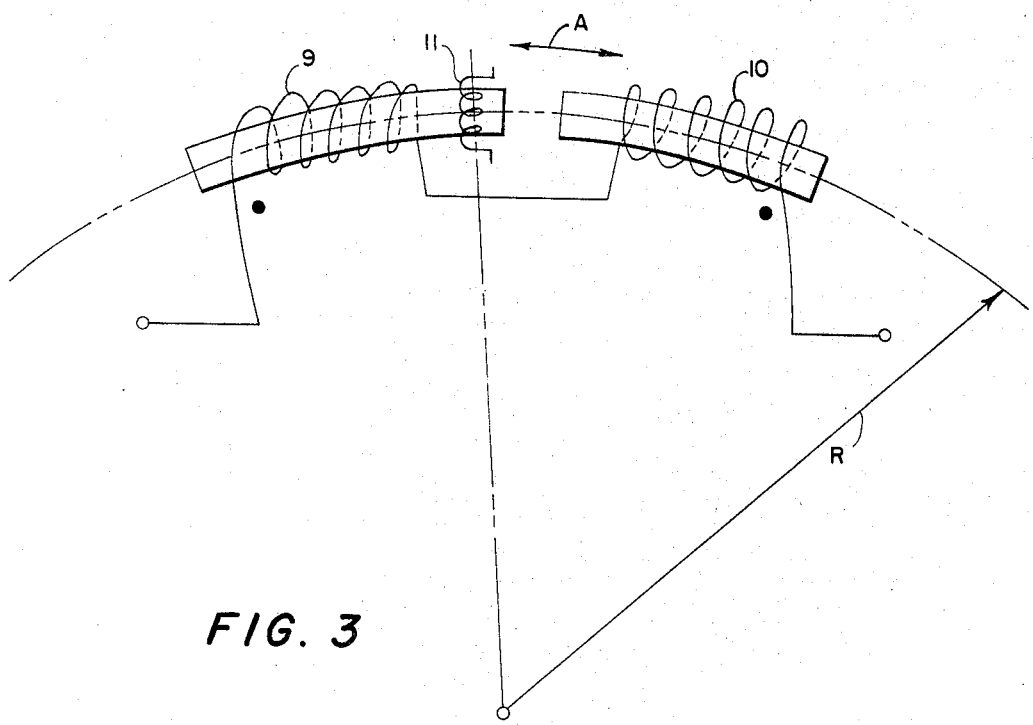
FIGURE 3 is a schematic plan view of the elements shown in FIGURE 2.

FIGURES 2 and 3 in elevation view and in plan view respectively. The arrow A indicates the direction of relative movement between the field coils and the detector coil.

Variations may be made to the above described embodiment.

For example if more convenient, the field coils could be fixed and the detector coil moved with the pylon and, furthermore, the detector coil energised and the field coils used as the detector. The winding of the two field coils could also be arranged so that the measure of flux density along its length is other than linear. Also a back up system could be incorporated by adding a second winding. A smaller, less sensitive, winding could be used to maintain operation.

Ferrite slugs or magnetic materials may be added to the field coil windings to enable the characteristics to be varied after installation, and providing these with a screwed adjustment as in tuning coil circuits would permit trimming of the control system response.

It is to be noted that the variation of flux density along the length of the field coils enables any form of pre-determined characteristics to be designed into the system which could enable the rate of response of a control system to be varied to suit the performance required from the system.

Although the embodiment described is for use with the steering control system of an air cushion vehicle, the invention is considered to have application for all types of position control and indicating mechanisms. It has the advantage, which can be of value in low power mechanical systems, of adding no additional load to the drive other than the inertia of the elements and the actual mechanical force required to generate the electromagnetic signal. Thus, it can similarly be applied to ships steering control and also air conditioning control by direct application to valves. Also, to tool control and material feeds in automatic machines.

I claim as my invention:

1. A pick-off device for detecting the positional relationship of first and second relatively moving parts, one part being angularly displaceable relative to the other part about a pivotal axis, comprising an elongated coil means attached to the first part and a magnetic field sensing means arranged on the second part, the elongated coil means being wound upon an elongated core and comprising two field coils which are in adjacent end to end relationship and which are curved into an arc, the radius of the arc being equal to the distance between the pivotal axis and the magnetic field sensing means, the coil means and the magnetic field sensing means being relatively moveable in close proximity to each other, one over the other, the windings of the two field coils being connected in phase opposition to each other, so that when energised with alternating current they produce a flux density varying along the arc of the coil means such that the voltage induced into the magnetic field sensing means is dependent upon the position of the magnetic field sensing means along the arc of the coil means such that the flux density increases from a null value, when the magnetic field sensing means coincides with the adjacent ends of the two field coils, to a maximum value at the other end of each field coil.

2. A pick-off device as claimed in claim 1 wherein the elongated coil means is fixed and the magnetic field sensing means is displaceable relative to the elongated coil means.

3. A pick-off device as claimed in claim 1, wherein the magnetic field sensing means is fixed and the elongated coil means is displaceable relative to the magnetic field sensing means.

4. A pick-off device as claimed in claim 1, wherein the flux density of the windings forming each part of the elongated coil means increases exponentially from said adjacent ends of the two field coils.

5. A pick-off device as claimed in claim 1 including means for varying the flux density of the elongated coil means by adding magnetic material to the core.

6. A pick-off device as claimed in claim 1 wherein the magnetic field sensing means includes an electrical coil.

References Cited

UNITED STATES PATENTS

| | | | |
|---|---|---|---|
| 1,671,106 | 5/1928 | Fisher | 340—196 |
| 1,789,196 | 7/1933 | Sams | 340—196 |
| 2,447,212 | 8/1948 | Schoeppel | 340—196 |
| 3,075,132 | 1/1963 | Moseley | 340—196 |
| 3,099,830 | 7/1963 | Wayman | 340—196 |
| 2,136,219 | 11/1938 | Scherbatskoy | 340—199 |
| 3,178,696 | 4/1965 | Claflin | 340—199 |
| 3,302,099 | 1/1967 | Packard | 340—199 |

THOMAS B. HABECKER, Primary Examiner

U.S. Cl. X.R.

336—120; 340—187